(12) United States Patent
Bauchot et al.

(10) Patent No.: US 10,592,891 B2
(45) Date of Patent: *Mar. 17, 2020

(54) METHOD AND SYSTEM FOR PERFORMING A COMMERCIAL TRANSACTION BY USING A SHORT MESSAGE SERVICE TERMINAL

(71) Applicant: International Business Machines Corporation, Armonk, NY (US)

(72) Inventors: Frederic Bauchot, Saint-Jeannet (FR); Gerard Marmigere, Drap (FR); Joaquin Picon, St. Laurent du Var (FR)

(73) Assignee: International Business Machines Corporation, Armonk, NY (US)

( * ) Notice: Subject to any disclaimer, the term of this patent is extended or adjusted under 35 U.S.C. 154(b) by 870 days.

This patent is subject to a terminal disclaimer.

(21) Appl. No.: 13/907,082

(22) Filed: May 31, 2013

(65) Prior Publication Data
US 2013/0262318 A1    Oct. 3, 2013

Related U.S. Application Data

(63) Continuation of application No. 11/081,045, filed on Mar. 15, 2005, now Pat. No. 8,468,093.

(30) Foreign Application Priority Data

Mar. 25, 2004 (EP) .................................. 04368020

(51) Int. Cl.
*G06Q 40/00* (2012.01)
*G06Q 20/32* (2012.01)
(Continued)

(52) U.S. Cl.
CPC ......... *G06Q 20/3255* (2013.01); *G06Q 20/12* (2013.01); *G06Q 20/3829* (2013.01); *G06Q 20/425* (2013.01); *H04W 4/14* (2013.01)

(58) Field of Classification Search
CPC .............. G06Q 20/32; G06Q 2220/14; G06Q 2220/00; H04M 15/8221
(Continued)

(56) References Cited

U.S. PATENT DOCUMENTS 5,604,744 A * 2/1997 Andersson et al. .......... 370/347
5,764,003 A    6/1998 Boone
(Continued)

FOREIGN PATENT DOCUMENTS

| CA | 2406880 | * | 4/2004 | ............ H04L 12/54 |
| WO | 03063528 A2 | | 7/2003 | |
| WO | 03063528 A3 | | 7/2003 | |
| WO | WO 2004/032542 A2 | * | 4/2004 | ............... H04Q 7/22 |

OTHER PUBLICATIONS

V.K. Gurbani, Xian-He Sun, A systematic approach for closer integration of cellular and Internet services, IEEE Network (vol. 19, Issue: 1, pp. 26-32), Jan. 1, 2005. (Year: 2005).*

(Continued)

*Primary Examiner* — Tien C Nguyen
(74) *Attorney, Agent, or Firm* — Scully, Scott, Murphy & Presser, P.C.; Scott Dobson, Esq.

(57) ABSTRACT

Method for performing a commercial transaction wherein a customer having a computer connected to a public network such as the Internet network and a SMS terminal is able to receive and send SMS messages over a telephone network and can order an article by using the computer to a commercial server connected to the public network.

20 Claims, 2 Drawing Sheets

(51) Int. Cl.
*G06Q 20/42* (2012.01)
*G06Q 20/12* (2012.01)
*G06Q 20/38* (2012.01)
*H04W 4/14* (2009.01)

(58) Field of Classification Search
USPC .......... 705/35, 40, 39, 38, 37, 51; 709/228, 709/217; 726/9; 370/352; 235/379; 455/419
See application file for complete search history.

(56) References Cited

U.S. PATENT DOCUMENTS

| | | | | |
|---|---|---|---|---|
| 5,887,253 | A * | 3/1999 | O'Neil et al. | 455/418 |
| 5,903,652 | A | 5/1999 | Mital | |
| 6,764,003 | B1 * | 7/2004 | Martschitsch et al. | 235/383 |
| 6,807,410 | B1 * | 10/2004 | Pailles | G06Q 20/02 455/407 |
| 6,868,391 | B1 | 3/2005 | Hultgren | |
| 7,853,782 | B1 * | 12/2010 | Geddes | G06F 21/33 705/78 |
| 8,468,093 | B2 | 6/2013 | Bauchot et al. | |
| 8,781,823 | B2 | 7/2014 | Pitroda et al. | |
| 8,781,923 | B2 * | 7/2014 | Pitroda | G06Q 20/02 705/30 |
| 2001/0037264 | A1 * | 11/2001 | Husemann | G06Q 20/04 705/26.81 |
| 2002/0065774 | A1 | 5/2002 | Young et al. | |
| 2002/0073046 | A1 * | 6/2002 | David | 705/67 |
| 2002/0128981 | A1 | 9/2002 | Kawan et al. | |
| 2003/0130958 | A1 | 7/2003 | Narayanan et al. | |
| 2003/0171993 | A1 | 9/2003 | Chappuis | |
| 2003/0212601 | A1 * | 11/2003 | Silva et al. | 705/17 |
| 2004/0019564 | A1 * | 1/2004 | Goldthwaite | G06Q 20/04 705/44 |
| 2004/0098350 | A1 * | 5/2004 | Labrou et al. | 705/64 |
| 2004/0176134 | A1 * | 9/2004 | Goldthwaite et al. | 455/558 |
| 2005/0215231 | A1 | 9/2005 | Bauchot et al. | |
| 2006/0282382 | A1 | 12/2006 | Balasubramanian et al. | |
| 2007/0198432 | A1 * | 8/2007 | Pitroda | G06Q 20/02 705/64 |
| 2008/0059375 | A1 * | 3/2008 | Abifaker | G06Q 20/04 705/44 |

OTHER PUBLICATIONS

Y. Labrou, J. Agre, L. Ji, J. Molina, Wireless wallet, The First Annual International Conference on Mobile and Ubiquitous Systems: Networking and Services, 2004. MOBIQUITOUS 2004. (pp. 32-41), Jan. 1, 2004. (Year: 2004).*

Scourias, John. A Brief Overview of GSM. Dec. 5, 1998. http://web.archive.org/web/19981205130933/http://kbs.cs.tuberlin.del-jutta/gsm/js-i ntro. html.
9 WAP Gateways. Section 9.3.4: Others. Jan. 11, 2003.http://web.archive.org/web/20030111 090436/http://www.eucybervote.org/Reports/MSI-WP2-D6V2-v1.0-08.htm.
Tyson, Jeff. How Encryption Works. How Stuff Works Website. Jun. 3, 2003. http://web.archive.org/web/20030605174 707 /http://computerhowstuffworks.com/encryption.htm.
Gao, Jerry. Mobile Payment Systems. San Jose State University. Oct. 2002; http://www/engr.sjsu.edu/gaojerry.
Wikipedia Entry on Public Key Infrastructure. Jan. 4, 2004. D D http://web.archive.org/web/200401 04170129/ http://en.wikipedia.org/wiki/Public_key_infrastructure.
3GPP TS 03.40 V7.S.0 (Dec. 2001), 3rd Generation Partnership Project; Technical Specification Group Terminals; Technical realization of the Short Message Service (SMS) (Release 1998).
Non-Final Office Action dated Mar. 11, 2008 for U.S. Appl. No. 11/081,045.
Amendment dated Apr. 28, 2008 for U.S. Appl. No. 11/081,045.
Final Office Action dated Jul. 24, 2008 for U.S. Appl. No. 11/081,045.
Amendment dated Oct. 20, 2008 for U.S. Appl. No. 11/081,045.
Non-Final Office Action dated Dec. 18, 2008 for U.S. Appl. No. 11/081,045.
Amendment dated Feb. 27, 2009 for U.S. Appl. No. 11/081,045.
Final Office Action dated May 29, 2009 for U.S. Appl. No. 11/081,045.
Amendment dated Nov. 25, 2009 for U.S. Appl. No. 11/081,045.
Appeal Brief dated Nov. 25, 2009 for U.S. Appl. No. 11/081,045.
Examiner's Answer dated Jun. 11, 2010 for U.S. Appl. No. 11/081,045.
Reply Brief dated Aug. 11, 2010 for U.S. Appl. No. 11/081,045.
Decision on Appeal dated Jan. 28, 2013 for U.S. Appl. No. 11/081,045.
Notice of Allowance dated Feb. 14, 2013 for U.S. Appl. No. 11/081,045.
Office Action, dated May 5, 2017, received in a related U.S. Appl. No. 14/333,052.
Office Action, dated Jun. 12, 2019, received in U.S. Appl. No. 14/333,052.
Y. Labrou, J. Agre, L. Ji, J. Moinda, "Wireless wallet", The First Annual International Conference on Mobile and Ubiquitous Systems: Networking and Services, 2004, MOBIQUITOUS 2004. (pp. 32-41), Jan. 1, 2004. (Year 2004).
Shoniregun et al., "Securing Mobile Product Ecology for Mobile Commerce (mC)", Proceedings of the 2005 IEEE International Conference on Services Computing (SCC'05), 2005 IEEE, Jan. 1, 2005, pp. 211-216.
Antovski et al., "M-Payments", 25th Int. Conf. Information Technology Interfaces ITI 2003, Jun. 16-19, 2003, Cavtat, Croatia, pp. 95-100.
Notice of Allowance, dated Dec. 3, 2019, received in U.S. Appl. No. 14/333,052.

* cited by examiner

METHOD AND SYSTEM FOR PERFORMING A COMMERCIAL TRANSACTION BY USING A SHORT MESSAGE SERVICE TERMINAL

CROSS REFERENCE TO RELATED APPLICATION

This application is a continuation of co-pending U.S. patent application Ser. No. 11/081,045, filed Mar. 15, 2005, and claims the benefit of foreign priority to European Application No. 04368020.6, filed Mar. 25, 2004, the entire content and disclosure of each of which is hereby incorporated herein by reference.

FIELD OF THE INVENTION

This invention relates to systems enabling users of any public network such as the Internet network to purchase articles on sale on commercial sites and in particular relates to a method for performing a commercial transaction by using a Short Message Service (SMS) terminal.

BACKGROUND OF THE INVENTION

There are more and more users of public networks such as the Internet network who are also customers doing electronic business by ordering articles offered by commercial sites. Electronic payment over a public network is a major issue for customers as well as for the commercial sites. The most secure payment method requires extra equipment be added to the customer machine to read a credit card. Unfortunately, this type of equipment is not widely available. The most common way of payment remains the use of a Secure Socket Layer (SSL) connection between the commercial site and the customer browser. SSL is a protocol that provides privacy over the Internet. However, even with this method, the customer credit card number is still sent over the public network making this information the most desirable data for hackers.

In order to avoid the drawbacks of public networks such as the Internet, another method to conduct electronic business uses SMS messages that can be easily sent from any mobile telephone. But SMS messages have the drawback that the service is generally unsuitable for electronic commerce where a secure and controlled data delivery is required. This problem has been solved by the system described in PCT patent application WO 03/063528, wherein, when an SMS message is transmitted via a cellular transmission network from a sender to a recipient, it is required to acknowledge receipt in a predetermined way and an acknowledgement message is subsequently transmitted to the sender of the SMS message.

Even though the system described above is more secure when using the SMS messages, the customer is still required to pay for the articles ordered on a commercial site by using a credit card. Therefore, the number of the credit card has to be either forwarded to the commercial site with the risks of being uncovered by hackers attacking the database of the commercial server or to be requested by a payment server using the Internet network with the risk of being intercepted by hackers when it is transmitted over the network.

OBJECTS AND SUMMARY OF THE INVENTION

Accordingly, one object of the invention is to achieve a method for performing a commercial transaction with a commercial site where the customer is not required to forward a credit card number to the commercial site after ordering articles over a public network such as the Internet network.

Another object of the invention is to achieve a method for performing a commercial transaction with a commercial site wherein SMS messages are used for identifying and authenticating a customer after the customer has ordered articles by using a public network such as the Internet network.

According to one aspect of the invention there is provided a method for performing a commercial transaction wherein a customer having a computer connected to a public network and an SMS terminal can receive and send SMS messages over a cellular network and can order an article by using the computer to a commercial server connected to the public network. The method comprising the following steps:

sending an SMS message from the commercial server through the cellular network, the SMS message including at least the address on the cellular network of a payment server including information about the article, the customer, after receiving the SMS message on the SMS terminal, redirecting to the payment server a modified SMS message and adding to the modified SMS message at least the information enabling the identification of a customer payment means.

According to another aspect of the invention there is provided a system for performing a commercial transaction wherein a customer having a computer connected to a public network and an SMS terminal is able to receive and send SMS messages over a cellular network and can order an article by using the computer connected to a commercial server and to the public network. The system comprises a payment server in charge of debiting an account of the customer with the article price and in that the commercial server includes means for sending to the SMS terminal an SMS message including at least the address on the cellular network of the payment server so that the computer can send a modified SMS message including information to enable the payment server to identify a customer payment means.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
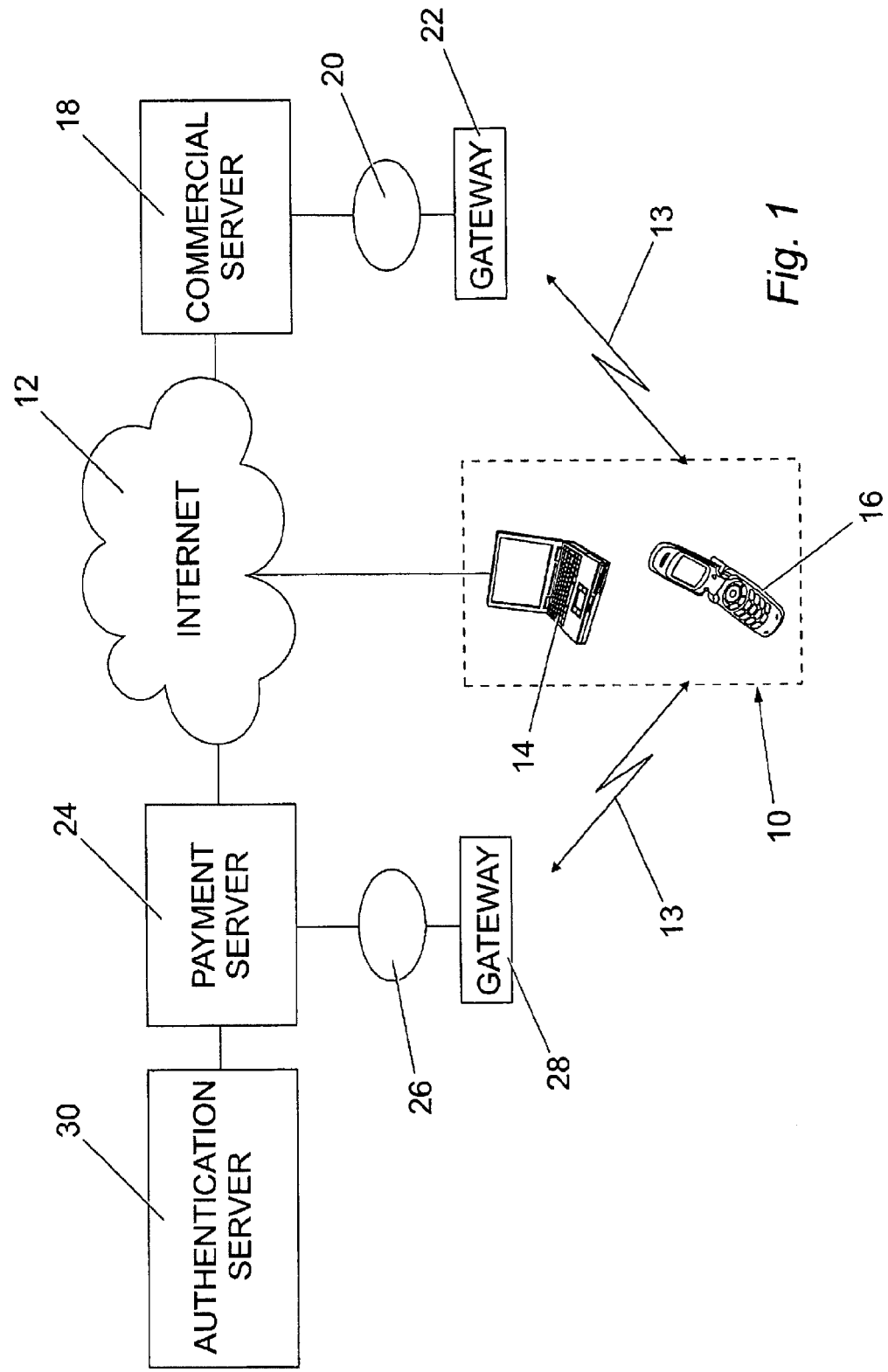
FIG. 1 is a block diagram representing a system wherein the method according to the invention is implemented.

According to a preferred embodiment illustrated in FIG. 1, a user 10 is connected to a public network 12, such as the Internet network, by a computer 14 and is connected to a cellular network 13, such as the Global System for Mobile communications (GSM) network or an equivalent network, by a mobile terminal 16.

The user 10 is a customer who is able to surf with a web browser on the site of a commercial server 18 through the public or Internet network. Assuming that customer 10 orders an article, the commercial server 18 which is also connected to an Intranet network 20 or other similar private network sends a SMS message to the customer. This SMS message is sent through the network 20 and is sent over the cellular network 13 through an SMS gateway 22.

The SMS message sent by the commercial server 18 and received by the mobile terminal 16 of the customer 10 asks the customer to provide some data to a payment server 24 connected to the Internet network. The SMS message containing now the requested information necessary to identify the customer and the number of the customer's payment card is redirected by the cellular network to the payment server through a SMS gateway 28 and over another Intranet network 26. Therefore, the sensitive information such as the customer identification number and the payment card number is neither transported over the Internet network nor shared with the commercial server 18, which are both not secure enough to avoid such sensitive information from hackers. Note that the security can be increased by an authentication server 30 in charge of authenticating the customer by an identification number on request of the payment server 24. An example of an identification number is a Mobile Station Integrated Services Digital Network (MSISDN) in the case of the GSM network.

Figure 2:
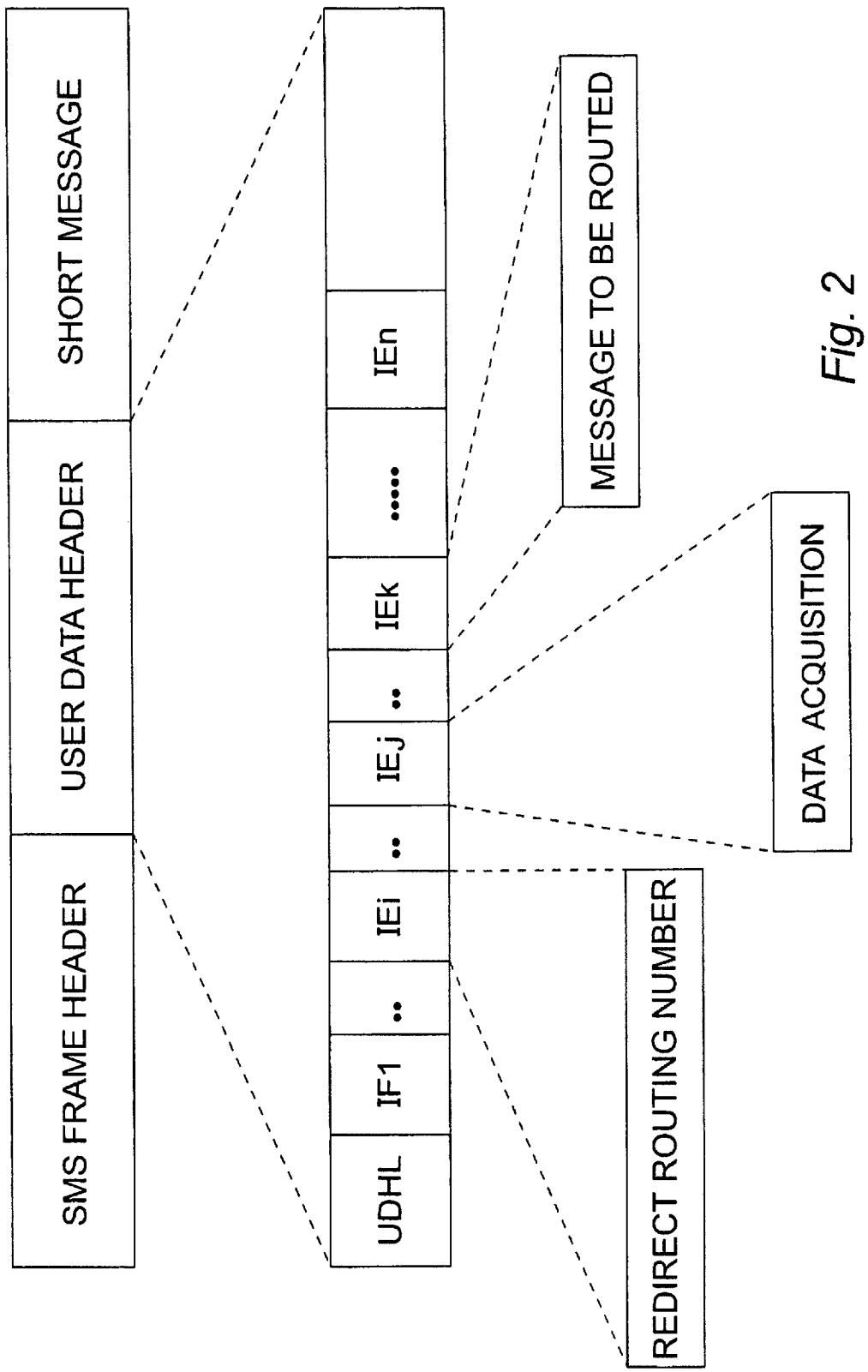
FIG. 2 is a diagram representing an SMS message and the fields thereof which are used to transport the information about the commercial transaction.

The SMS message sent by the commercial server 18 to the mobile terminal 16 is illustrated in FIG. 2. It is a data frame as specified in the 3GPP Technical Specification document "Generation partnership project"; Technical specification group terminals; Technical realization of the Short Message Service (SMS).

The SMS message contains an SMS frame header and a SMS frame body also known as the TP-UD (Transfer-layer Protocol User Data), which may comprise the short message content, i.e. the commands to manage the SMS receiving device, and in addition a User Data Header (UDH). The presence of a UDH is identified by the setting of an indicator in the SMS frame header, namely the User Data Header Indicator (UDHI). When the UDHI value is set to zero, the TP-UD field comprises only the short message. When the UDHI value is set to one, which is the case in the invention, this means that the TP-UD field comprises a User Data Header.

The User Data Header is composed of a User Data Header Length (UDHL) and a plurality of Information Elements (IE1 to IEn). Some Information Elements are currently reserved and other IE groups, at least three IEs, are not allocated and free of use. The invention allocates three IE groups for signaling the redirection of the SMS message as explained hereafter.

The three Information Elements used in the SMS according to the invention are as follows:

1. Redirect routing number

It is the MSISDN to which the SMS has to be routed, that is the MSISDN of the payment server 2. Data acquisition It describes the type of data entered by the customer before rerouting the SMS 3. Message to be routed It is the message sent by the commercial server and rerouted to the payment server. This message contains information belonging to the transaction (order identifier, customer name, article price)

It must be noted that data sent by the user can be encrypted with a key provided by the commercial server. Generally, this key is the public key of the payment server and is contained in the Data acquisition element.

The contents of the Data acquisition element are the following:
First byte
Bits 7 6
0 0 No input
0 1 Unused
1 0 Alphanumeric input
1 1 Numeric input
Input Digits count qualifier
Bit 5
Number of digits required
Maximum number of digits
Bit 4 3
0 0 No encryption
0 1 Encryption with provided key
Bits 2 1 0 Unused
Second byte
Input Digits count
Bits 7 6 5 Unused
Bits 4 3 2 1 0 (Min 1 Max 32
Third byte Encryption key length
Fourth byte to byte n Encryption key As mentioned in the IE Data acquisition, the first byte indicates whether a numeric input must be input or not. In fact there are three possibilities within the scope of the invention:

The SMS message requests the user to input his/her card number so that the payment server may authenticate the user by verifying that the owner information associated with this card number corresponds to the information provided by the commercial server. Security is ensured by the fact that the card number is transferred over a GSM link more secure than an Internet link and the card number does not transit through the commercial server and is not kept on said commercial server data base. In this case, a message is displayed on the screen of the mobile terminal, for example, "you ordered a Palm PDA at price 350€. Confirm by entering your Visa card number + # + personal code and press OK"

b) The SMS message requests the user to input his/her card number as in the first embodiment by displaying a message on the screen, but the payment server has the capability to authenticate the user by MSISDN. This method increases the security as the transaction must be done with the mobile terminal of the customer registered in the commercial server.

c) The SMS message does not request entry of the card number as above. Instead, a pin code is entered to increase security. The payment server authenticates the user by his/her MSISDN number and retrieves the card number associated with it. With this method, the card number does not transit on any network.

After the SMS message has been received by the user and information is input or not in Data acquisition as explained above, an SMS message is re-directed to the payment server. This redirected message may contain two Information elements.

1. Message to be routed which includes the same information as received by the user, that is the information belonging to the transaction (order identifier, customer name, article price).

2. Local data

This information element contains the data entered by the user. The data is encrypted or not depending of the flag set in Data acquisition element of the received message.

After authentication of the customer by the payment server and the customer account debit, the payment server informs the commercial server that the transaction has been completed successfully and/or the customer that the account debit has been completed. Then the commercial server may send a transaction receipt by mail to the customer.

It must be noted that, though the invention has been described in a preferred embodiment wherein the customer uses a mobile terminal, the invention could be implemented in any system wherein the customer has a terminal able to receive and send SMS messages over the GSM network or any other equivalent network different from the Internet network.

What is claimed is:

1. A method of using a public network and a cellular network to send and receive specified information to order and pay for an article, said method comprising:
    a customer using a computer to send an order for an article through the public network to a commercial server;
    said commercial server sending a short message service (SMS) message, through the cellular network, from said commercial server to an SMS terminal, said SMS message including a redirect routing number and an encryption key;
    said customer, by using said SMS terminal, adding to said SMS message information enabling identification of a customer payment means;
    encrypting, by using said encryption key, said information in the SMS message; and
    the SMS terminal, by using said redirect routing number, redirecting the SMS message, with said encrypted information therein, through said cellular network, from said SMS terminal to a payment server.

2. The method according to claim 1, wherein said encryption key is a public encryption key.

3. The method according to claim 2, wherein said encryption key is a public encryption key of the payment server.

4. The method according to claim 1, wherein the sending an SMS message includes setting in the SMS message a flag for indicating to the payment server that the SMS message redirected to the payment server includes information encrypted using said encryption key.

5. The method according to claim 1, wherein said redirect routing number includes an identification number of said payment server on said cellular network.

6. The method according to claim 1, further comprising said payment server authenticating said customer by using an identification number of said customer on said cellular network.

7. The method according to claim 1, wherein said sending an SMS message includes said SMS message requesting said customer to input a customer card number into said SMS terminal, said card number being included in said SMS message redirected to said payment server.

8. The method according to claim 1, wherein said sending an SMS message includes requesting said customer to input a personal identification number (PIN) code into said SMS terminal, said PIN code being included in said SMS message redirected to said payment server to retrieve said customer card number.

9. The method according to claim 1, wherein said adding to said SMS message includes adding to said SMS message an order identifier, a customer name and an article price.

10. The method according to claim 1, further comprising said payment server authenticating said customer; and after authenticating said customer, debiting a customer's account and informing said commercial server that said commercial transaction has been completed successfully.

11. The method according to claim 1, wherein:
    the commercial server sending an SMS message, through a cellular network, from said commercial server to the SMS terminal includes sending the SMS message through a first SMS gateway of the cellular network;
    the SMS terminal, by using said redirect routing number, redirecting the SMS message, through said cellular network, from said SMS terminal to a payment server includes directing the SMS message through a second SMS gateway of the cellular network;
    the SMS message including a series of fields, each of the fields including a plurality of changeable physical bits, and one of said fields including a byte for indicating whether a numeric input must be input;
    the customer adding to said SMS message information enabling identification of a customer payment means includes the customer using the short message terminal to change the physical bits of one of the field of the SMS message to form a pattern identifying said customer payment means, including when said byte indicates a numeric input must be input, the customer adding to the SMS message a numeric input enabling identification of the customer payment means.

12. A system for using a public network and a cellular network to send and receive specified information to order and pay for an article said system comprising:
    a computer for ordering an article;
    a commercial server for receiving the order for the article;
    a short message service (SMS) terminal; and
    a payment server configured for debiting a customer account with a price for said article; and
    wherein:
    a customer uses the computer to send the order for the article through the public network to the commercial server;
    the commercial server sends an SMS message, through the cellular network, to the SMS terminal, said SMS message including a redirect routing number, and an encryption key;
    the customer uses the SMS terminal to add to said SMS message information enabling identification of a customer payment means and uses said encryption key to encrypt said information; and
    the SMS terminal redirects the SMS message, by using said redirect routing number, and with said encrypted identification information, from said SMS terminal to said payment server through said cellular network.

13. The system according to claim 12, wherein said encryption key is a public encryption key.

14. The system according to claim 13, wherein said public encryption key is a public encryption key of the payment server.

15. The system according to claim 14, wherein the commercial server sends an SMS message includes setting in the SMS message a flag for indicating to the payment server that the SMS message redirected to the payment server includes encrypted information encrypted using said encryption key.

16. The system according to claim 12, wherein said customer payment means is a credit card.

17. The system according to claim 12, wherein said cellular network is a Global System for Mobile Communication (GSM) network.

18. The system according to claim 12, wherein said SMS terminal is a mobile terminal.

19. The system according to claim 12, wherein said redirect routing number includes an identification number of said payment server on said cellular network.

20. The system according to claim 12, wherein said payment server authenticates said customer by using an identification number of said customer on said cellular network.

* * * * *